(12) United States Patent
Chen et al.

(10) Patent No.: US 11,005,717 B2
(45) Date of Patent: May 11, 2021

(54) STORAGE CAPACITY EVALUATION METHOD BASED ON CONTENT DELIVERY NETWORK APPLICATION AND DEVICE THEREOF

(71) Applicant: WANGSU SCIENCE & TECHNOLOGY CO., LTD., Shanghai (CN)

(72) Inventors: Xiaowei Chen, Shanghai (CN); Xu Zhang, Shanghai (CN); Yajuan Zheng, Shanghai (CN); Li Ye, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 148 days.

(21) Appl. No.: 16/465,035

(22) PCT Filed: Aug. 21, 2018

(86) PCT No.: PCT/CN2018/101516
§ 371 (c)(1),
(2) Date: May 29, 2019

(87) PCT Pub. No.: WO2020/015047
PCT Pub. Date: Jan. 23, 2020

(65) Prior Publication Data
US 2020/0344128 A1    Oct. 29, 2020

(30) Foreign Application Priority Data
Jul. 16, 2018    (CN) .......................... 201810779131.2

(51) Int. Cl.
*G06F 13/00*    (2006.01)
*H04L 12/24*    (2006.01)
*H04L 29/08*    (2006.01)

(52) U.S. Cl.
CPC ...... *H04L 41/0896* (2013.01); *H04L 67/2842* (2013.01)

(58) Field of Classification Search
CPC ............. H04L 41/0896; H04L 67/2842; H04L 67/1097; H04L 41/0893; G06F 16/9574
(Continued)

(56) References Cited

U.S. PATENT DOCUMENTS

| 5,081,840 A | 1/1992 | Landon |
| 7,428,540 B1 | 9/2008 | Coates et al. |

(Continued)

FOREIGN PATENT DOCUMENTS

| CN | 102801550 A | 11/2012 |
| CN | 103581051 A | 2/2014 |

(Continued)

OTHER PUBLICATIONS

The European Patent Office (EPO) The Extended European Search Report for 18900579.6 dated Feb. 12, 2020 7 Pages.
(Continued)

*Primary Examiner* — Kenneth R Coulter
(74) *Attorney, Agent, or Firm* — Anova Law Group, PLLC (57) ABSTRACT

Method and device of storage capacity evaluation based on a CDN application are provided. The method includes: for any cache server corresponding to a target service, using files stored before a preset time node as old files in the cache server; determining a proportion of the old files in all files stored by the cache server and a visiting rate of the old files within a preset visit time range; determining an adjustment type of a storage capacity of the cache server according to the proportion of the old files and the visiting rate of the old files, where the adjustment type at least includes capacity to-be-expanded, capacity to-be-reduced and capacity
(Continued)

unchanged; and determining an adjustment type of a storage capacity of the target service according to adjustment types of storage capacities of all cache servers corresponding to the target service.

13 Claims, 2 Drawing Sheets

(58) Field of Classification Search
USPC ........ 709/203, 226, 229, 224, 223, 213–216
See application file for complete search history.

(56) References Cited

U.S. PATENT DOCUMENTS

| | | | | |
|---|---|---|---|---|
| 8,539,022 | B2* | 9/2013 | Betancourt | H04L 67/2828 |
| | | | | 709/203 |
| 9,628,350 | B2* | 4/2017 | Dippenaar | H04L 67/16 |
| 10,257,304 | B2* | 4/2019 | Lavi | H04L 67/2842 |
| 10,594,571 | B2* | 3/2020 | Dippenaar | G06F 3/0605 |
| 2002/0143798 | A1 | 10/2002 | Lisiecki et al. | |
| 2008/0235360 | A1* | 9/2008 | Li | G06F 16/9574 |
| | | | | 709/223 |
| 2011/0208920 | A1* | 8/2011 | Betancourt | H04L 67/28 |
| | | | | 711/141 |
| 2016/0127200 | A1* | 5/2016 | Dippenaar | G06F 3/0605 |
| | | | | 709/224 |
| 2017/0222890 | A1* | 8/2017 | Dippenaar | G06F 16/183 |
| 2017/0353574 | A1* | 12/2017 | Lavi | H04L 67/2876 |
| 2018/0091619 | A1 | 3/2018 | Power et al. | |

FOREIGN PATENT DOCUMENTS

| | | |
|---|---|---|
| CN | 104469392 A | 3/2015 |
| CN | 104881477 A | 9/2015 |
| CN | 106020732 A | 10/2016 |
| CN | 106027642 A | 10/2016 |
| CN | 106502576 A | 3/2017 |
| CN | 106888381 A | 6/2017 |
| WO | 2012152771 A2 | 11/2012 |

OTHER PUBLICATIONS

The World Intellectual Property Organization (WIPO) International Search Report and Written Opinion for PCT/CN2018/101516 dated Apr. 17, 2019 8 Pages.
The China National Intelleectual Property Administration (CNIPA) The China Search Report for 201810779131.2 dated Jan. 2, 2020 5 Pages.

* cited by examiner

STORAGE CAPACITY EVALUATION METHOD BASED ON CONTENT DELIVERY NETWORK APPLICATION AND DEVICE THEREOF

CROSS-REFERENCES TO RELATED APPLICATIONS

This application is a national phase entry under 35 U.S.C § 371 of International Application No. PCT/CN2018/101516 filed on Aug. 21, 2018, which claims priority of Chinese Patent Application No. 2018107791312, filed with the State Intellectual Property Office of P. R. China on Jul. 16, 2018, the entire content of all of which is incorporated herein by reference.

FIELD OF THE DISCLOSURE

The present disclosure generally relates to the technical field of content delivery network (CDN) and, more particularly, relates to a storage capacity evaluation method based on a CDN application and its device.

BACKGROUND

Service operators may provide services such as on-demand, live broadcast and download to users through the CDN system, and the services may be implemented by a plurality of cache servers in the CDN system. The cache servers may locally cache data resources provided by a service source station. When the data resources are needed to be acquired, the users may not need to visit the service source station and may directly acquire the corresponding data resources through the cache servers.

In order to reduce operating costs and improve user visit efficiency, the storage capacities of the cache servers may be evaluated. Generally, the usage of the storage capacities may be used as an evaluation criterion to determine whether the storage capacities are full or still have available space, then the storage capacities of the cache servers may be expanded or reduced. On the one hand, the existing evaluation method may only consider the storage capacities of the cache servers and may not distinguish service types running on the cache servers. However, different services have different cache requirements. For example, the live broadcast service only require that the cache servers may store certain data in a short period of time and the capacities may not be expanded even if the storage capacities of the cache servers are full. However, the download service may have a relatively high demand for long-term data caching and may require the cache servers to store a large amount of data for a long term. Therefore, when the storage capacities are full, the storage capacities of the cache servers should be expanded in time to reduce back-to-source processing after the data are deleted. On the other hand, increasing the storage capacities of the cache servers may result in a corresponding increase in storage costs, while decreasing the storage capacities of the cache servers may increase the amount of back-to-source data, which may increase bandwidth costs. Evaluating the storage capacities of the cache servers based only on current storage capacities may have a high probability of causing a significant increase in the total costs. Therefore, there is a need for a comprehensive storage capacity evaluation method which may balance the storage costs and the bandwidth costs for different services and reduce total operating costs.

BRIEF SUMMARY OF THE DISCLOSURE

In order to solve the problems in the existing technology, embodiments of the present disclosure provide a storage capacity evaluation method based on a CDN application and its device.

In one aspect, the present disclosure provides a method of a storage capacity evaluation based on a CDN application. The method includes:

for any cache server corresponding to a target service, using files stored before a preset time node as old files in the cache server;

determining a proportion of the old files in all files stored by the cache server and a visiting rate of the old files within a preset visit time range;

determining an adjustment type of a storage capacity of the cache server according to the proportion of the old files and the visiting rate of the old files, wherein the adjustment type at least includes capacity to-be-expanded, capacity to-be-reduced and capacity unchanged; and determining an adjustment type of a storage capacity of the target service according to adjustment types of storage capacities of all cache servers corresponding to the target service.

Further, using the files stored before the preset time node as the old files in the cache server includes:

acquiring file operation information generated within a preset query time range according to a statistics log within the preset query time range of the cache server, wherein the file operation information includes file name, file size, file write time and last visit time;

using files corresponding to the file operation information having a write time after the preset time node as new files; and using files corresponding to the file operation information having the write time before the preset time node as the old files.

Further, determining the proportion of the old files in the all files stored by the cache server includes:

determining a total amount of storage of the new files according to a file size of all of the new files;

determining a total amount of storage of the old files according to the total amount of storage of the new files and the storage capacity of the cache server; and determining the proportion of the old files according to the total amount of storage of the old files and the storage capacity of the cache server.

Further, determining the visiting rate of the old files within the present visit time range includes:

determining the old files having a last visit time within the preset visit time range as active old files;

determining a total amount of storage of the active old files according to a file size of all of the active old files; and determining the visiting rate of the old files according to the total amount of storage of the active old files and the total amount of storage of the old files.

Further, determining the adjustment type of the storage capacity of the cache server according to the proportion of the old files and the visiting rate of the old files includes:

if the proportion of the old files is greater than a preset proportion threshold and the visiting rate of the old files is less than a preset visiting rate threshold, determining the adjustment type of the storage capacity of the cache server as the capacity to-be-reduced;

if the proportion of the old files is less than the preset proportion threshold and the visiting rate of the old files is greater than the preset visiting rate threshold, determining the adjustment type of the storage capacity of the cache server as capacity the to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determining the adjustment type of the storage capacity of the cache server as the capacity unchanged.

Further, determining the adjustment type of the storage capacity of the target service according to the adjustment types of storage capacities of all of the cache servers corresponding to the target service includes:

determining a number of the cache servers corresponding to each target adjustment type of the storage capacity under the target service;

if a proportion of the cache servers corresponding to the target adjustment type in all of the cache servers corresponding to the target service is greater than a preset ratio, using the target adjustment type as the adjustment type of the storage capacity of the target service; and otherwise, setting the adjustment type of the storage capacity of the target service as to-be-determined.

In another aspect, the present disclosure provides a device of a storage capacity evaluation based on a CDN application. The device includes:

a classification module, for any cache server corresponding to a target service, configured to use files stored before a preset time node as old files in the cache server;

a calculation module, configured to determine a proportion of the old files in all files stored by the cache server and a visiting rate of the old files within a preset visit time range; and an evaluation module, configured to determine an adjustment type of a storage capacity of the cache server according to the proportion of the old files and the visiting rate of the old files, where the adjustment types includes capacity to-be-expanded, capacity to-be-reduced and capacity unchanged; and configured to determine an adjustment type of a storage capacity of the target service according to adjustment types of the storage capacities of all of the cache servers corresponding to the target service.

Further, the classification module is specifically configured for:

acquiring file operation information generated within a preset query time range according to a statistics log within the preset query time range of the cache server, wherein the file operation information includes file name, file size, file write time and last visit time;

using files corresponding to the file operation information having a write time after the preset time node as new files; and using files corresponding to the file operation information having the write time before the preset time node as the old files.

Further, the calculation module is specifically configured for:

determining a total amount of storage of the new files according to a file size of all of the new files;

determining a total amount of storage of the old files according to the total amount of storage of the new files and the storage capacity of the cache server; and determining the proportion of the old files according to the total amount of storage of the old files and the storage capacity of the cache server.

Further, the calculation module is specifically configured for:

determining the old files having a last visit time within the preset visit time range as active old files;

determining a total amount of storage of the active old files according to a file size of all of the active old files; and determining the visiting rate of the old files according to the total amount of storage of the active old files and the total amount of storage of the old files.

Further, the evaluation module is specifically configured for:

if the proportion of the old files is greater than a preset proportion threshold and the visiting rate of the old files is less than a preset visiting rate threshold, determining the adjustment type of the storage capacity of the cache server as the capacity to-be-reduced;

if the proportion of the old files is less than the preset proportion threshold and the visiting rate of the old files is greater than the preset visiting rate threshold, determining the adjustment type of the storage capacity of the cache server as the capacity to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determining the adjustment type of the storage capacity of the cache server as the capacity unchanged.

Further, the evaluation module is specifically configured for:

determining a number of the cache servers corresponding to each target adjustment type of the storage capacity under the target service;

if a proportion of the cache servers corresponding to the target adjustment type in all of cache servers corresponding to the target service is greater than a preset ratio, using the target adjustment type as the adjustment type of the storage capacity of the target service; and otherwise, setting the adjustment type of the storage capacity of the target service as to-be-determined.

In another aspect, the present disclosure provides a cache server. The cache server includes a processor and a memory, where the memory stores at least one instruction, at least one program segment, a code set or an instruction set; and when loading and executing the at least one instruction, the at least one program segment, the code set, or the instruction set, the processor is configured to implement the storage capacity evaluation method based on the CDN application according to above-mentioned aspects.

In another aspect, the present disclosure provides a computer readable storage medium, where the storage medium stores at least one instruction, at least one program segment, a code set or an instruction set; and when loading and executing the at least one instruction, the at least one program segment, the code set or the instruction set, the processor is configured to implement the storage capacity evaluation method based on the CDN application according to above-mentioned aspects.

The technical solutions provided by embodiments of the present disclosure have the following beneficial effects.

In the embodiments of the present disclosure, for any cache server corresponding to the target service, the files stored before the preset time node may be used as the old files in the cache server; the proportion of the old files in the all files stored in the cache server and the visiting rate of the old files within the preset visit time range may be determined; the adjustment type of the storage capacity of the cache server may be determined according to the proportion of the old files and the visiting rate of the old files, and the adjustment type may include at least the capacity to-be-expanded, the capacity to-be-reduced and the capacity unchanged; the adjustment type of the storage capacity of the target service may be determined according to the adjustment types of the storage capacities of all of the cache servers corresponding to the target service. In such way, the data visiting situation of the cache server may be judged by the proportion of the old files and the visiting rate of the old files, and the storage requirements and bandwidth requirements of the cache server may be obtained. Then, the adjustment type of the storage capacity of the cache server may be determined and the evaluation of the target service may be implemented by evaluating each cache server of the target service. Therefore, while considering the storage costs and the bandwidth costs, different services may be evaluated.

BRIEF DESCRIPTION OF THE DRAWINGS

To more clearly illustrate the technical solutions of the present disclosure, the accompanying drawings to be used in the description of the disclosed embodiments are briefly described hereinafter. Obviously, the drawings described below are merely some embodiments of the present disclosure. Other drawings derived from such drawings may be obtained by a person having ordinary skill in the art without creative labor.

DETAILED DESCRIPTION

To more clearly describe the objectives, technical solutions and advantages of the present disclosure, the present disclosure is further illustrated in detail with reference to the accompanying drawings in conjunction with embodiments.

Embodiments of the present disclosure provide a storage capacity evaluation method based on a CDN application, which may be applied to cache servers of a CDN system. The cache servers may store files such as video, audio, texts and images, and may provide various types of services to users. Each service may be implemented by relying on a plurality of cache servers together and each cache server may be independent of each other. First, the storage capacities of all cache servers may be evaluated respectively, and then the storage capacity of the service may be considered as a whole to be evaluated. The cache server may include a processor, a memory and a transceiver. The processor may be configured to perform a process for determining an adjustment type of the storage capacity in the following procedure. The memory may be configured to store required data and generated data during the processing. The transceiver may be configured to receive and transmit relevant data during the processing. In one embodiment, the application scenario may be: selecting a cache server under a target service and determining old files stored in the cache server; further determining a proportion of the old files and a visiting rate of the old files in all files stored on the cache server and determining an adjustment type of a storage capacity of the cache server according to the proportion of the old files and the visiting rate of old files; performing the above-mentioned processing on all of the cache servers under the target service; then determining an adjustment type of a storage capacity of the target service according to the adjustment types of the storage capacities of all of the cache servers. The evaluation method may be advantageous to overall adjust all of the cache servers from the service layer and may be convenient for integrated management and operation.

Figure 1:
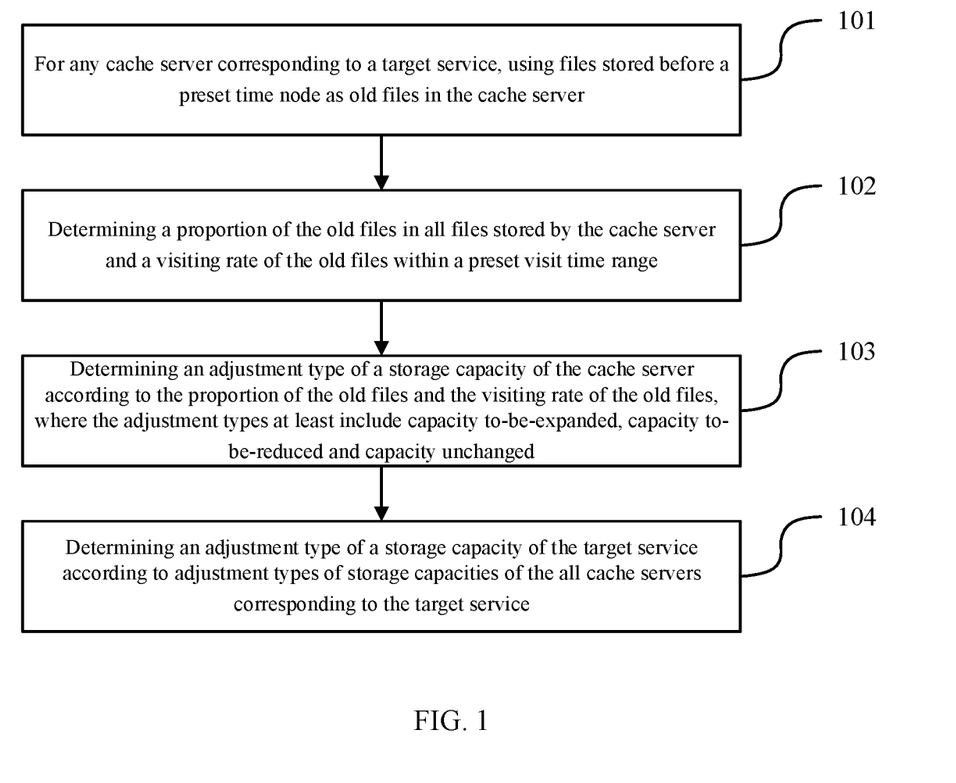
FIG. 1 illustrates a flow chart of a storage capacity evaluation method based on a CDN application according to embodiments of the present disclosure.

The processing procedure of the storage capacity evaluation based on the CDN application shown in FIG. 1 may be described in detail with reference to embodiments. The content may be the following.

Step 101: for any cache server corresponding to the target service, using files stored before a preset time node as old files in the cache server.

In one embodiment, for the target service, an administrator may first select any cache server from the cache servers corresponding to the target service, then set a time node on the cache server, and use the files stored on the cache server before the time node as the old files. The time node may be set to 7 days and the files stored on the cache server before 7 days may be the old files. It should be understood that, to integrate the evaluation criteria of all cache servers under the same service, the preset time node on each server may be the same for all of the cache servers under the same service.

Optionally, the process of setting the files stored in the cache server before the preset time node as the old files may be specifically the following: acquiring file operation information generated within the preset query time range according to a statistics log within the preset query time range of the cache server, where the file operation information may include file name, file size, file write time and last visit time; using files corresponding to the file operation information that the file write time is after the preset time node as the new files; and using files corresponding to the file operation information that the file write time is before the preset time node as the old files.

In one embodiment, one statistics log may be generated on the cache server correspondingly when the files stored on the cache server is read, written, modified, deleted, etc. The content of the statistics log record may include the file operation information and the file operation content. The file operation information may specifically include content information related to file attributes such as file name, file size, file write time, last visit time, etc. The file operation content may include content information such as file reading, writing, modifying, deleting, etc. Generally, the statistics log may be saved in the cache server for a long period of time, that is, the cache server may store the statistics log for a long period of time. For the cache server that has been running for a relatively long period of time, the number of the statistics logs may be relatively large. Therefore, the administrator may preset the query time range of the statistics logs on the cache server to reduce the amount of the file operation information acquired subsequently. Generally, the query time range may be set to within 30 days (1-30 days). Of course, the query time range may be set to other time ranges according to actual situations of the service or the cache server, or may be set to a specific time range such as X month X day-Y month Y day. Of course, the query time range may also be set to acquire all statistics logs on the cache server. After setting the query time range and time node, the cache server, within the set query time range, may convert the time node into an actual date within the query time range. After acquiring the file operation information from the statistics logs within the preset query time range, the cache server may use the files corresponding to the file operation information having a file write time after the preset time node as the new files and may use the files corresponding to the file operation information having a file write time before the preset time node as the old files according to the file write time in the file operation information. It can be understood that, for different services, file IDs instead of file names may be used in the statistics logs.

For example, the current date is March 30. The preset query time range on the cache server is 30 days and the preset time node is 7 days. The actual date of the time node within the query time range is March 24. The cache server may query the statistics logs from March 1 to March 30 in all stored statistics logs to obtain the corresponding file operation information. Then, the file operation information that the write time is from March 24 to March 30 may be selected and the files corresponding to the file names in the file operation information may be used as the new files. The file operation information that the write time is from March 1 to March 23 may be selected and the files corresponding to the file names in the file operation information may be used as the old files.

Step 102: determining the proportion of the old files in the all files stored by the cache server and the visiting rate of the old files within a preset visit time range.

In one embodiment, after determining the old files, the cache server may further determine the proportion of the old files in the all files stored on the cache server. In addition, the visit time range may also be set on the cache server to determine the visiting rate of the old files within the visit time range. Generally, the visit time range may be set to 24 hours, that is, the visiting rate of the old files within 24 hours before the current time may be determined. It can be understood that, to integrate the evaluation criteria of all cache servers under the same service, the preset visit time range on each server may be the same for all of the cache servers under the same service.

Optionally, since the old files are written earlier, some old files may have been deleted by the cache server, while the new files are written later than the old files, and generally, the new files may be deleted only after all of the old files are deleted. Therefore, the specific process of determining the proportion of the old files in the all files stored by the cache server may be the following: determining a total amount of storage of the new files according to a file size of all of the new files; determining a total amount of storage of the old files according to the total amount of storage of the new files and the storage capacity of the cache server; and determining the proportion of the old files according to the total amount of storage of the old files and the storage capacity of the cache server.

In one embodiment, after determining the new files and old files, the cache server may acquire the file size of each of all of the new files and then may statistically calculate the file size of all of the new files to obtain the total amount of storage of the new files. Then, the remaining part for subtracting the total amount of storage of the new files from the storage capacity of the cache server may be the total amount of storage of the old files. Finally, a ratio of the total amount of storage of the old files to the storage capacity of the cache server may be the proportion of the old files. It can be understood that, if the statistically calculated total amount of storage of the new files is greater than or equal to the storage capacity of the cache server, that is, the calculated total amount of storage of the old files is zero or negative, all files stored on the cache server within the preset query time range may be indicated to be the new files and even a portion of the new files may have been deleted. The time node and query time range may be adjusted, for example, the lower time limit of the query time range may be extended, or the value of the time node may be reduced.

Optionally, the specific process of determining the visiting rate of the old files within the present visit time range may be the following: determining the old files that the last visit time is within the preset visit time range as active old files; determining the total amount of storage of the active old files according to the file size of all of the active old files; and determining the visiting rate of the old files according to the total amount of storage of the active old files and the total amount of storage of the old files.

In one embodiment, after determining the new files and old files, the old files having the last visit time within the preset visit time range may be selected from all of the old files as the active old files by the cache server. Then, the file size of each active old file may be acquired, and the file size of all of the active old files may be statistically calculated to obtain the total amount of storage of the active old files. The ratio of the total amount of storage of the active old files to the total amount of storage of the old files may be used as the visiting rate of the old files according to the previously calculated total amount of storage of the old files.

Step 103: determining an adjustment type of a storage capacity of the cache server according to the proportion of the old files and the visiting rate of the old files.

The adjustment types may at least include capacity to-be-expanded, capacity to-be-reduced, and capacity unchanged.

In one embodiment, after acquiring the proportion of the old files and the visiting rate of the old files, at least three adjustment types such as capacity to-be-expanded, capacity to-be-reduced and capacity unchanged of the storage capacities of the cache servers may be determined according to the specific result of the proportion of the old files and the visiting rate of the old files.

Optionally, according to the proportion of the old files and the visiting rate of the old files, the specific process of determining the adjustment type of the storage capacity of the cache server may be the following: if the proportion of the old files is greater than a preset proportion threshold and the visiting rate of the old files is less than a preset visiting rate threshold, determining the adjustment type of the storage capacity of the cache server as the capacity to-be-reduced; if the proportion of the old files is less than the preset proportion threshold and the visiting rate of the old files is greater than the preset visiting rate threshold, determining the adjustment type of the storage capacity of the cache server as the capacity to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determining the adjustment type of the storage capacity of the cache server as the capacity unchanged.

In one embodiment, after obtaining the proportion of the old files and the visiting rate of the old files calculated by the cache server, the calculated proportion of the old files and the calculated visiting rate of the old files may be compared with the proportion threshold and the visiting rate threshold preset by the administrator respectively. If the proportion of the old files is greater than the preset proportion threshold and the visiting rate of the old files is less than the preset visiting rate threshold, it may indicate that the cache server may store a large amount of the old files with relatively low revisiting demands and more rely on the new files to provide services to users, and the services that more rely on back-to-source (e.g., live broadcast) may run on the cache server. Regardless of the storage capacity, the cache server may always maintain a certain rate of back-to-source to acquire new files continuously. Even if the storage capacity of the cache server is reduced within a certain range, the rate of back-to-source may not be increased. Therefore, the adjustment type of the storage capacity of the cache server may be determined as the capacity to-be-reduced. If the proportion of the old files is less than the preset proportion threshold and the visiting rate of the old files is greater than the preset visiting rate threshold, it may indicate that the old files stored on the cache server may have relatively high revisiting demands, and a portion of the old files with relatively high revisiting demands may have been deleted due to the limit of storage capacity. The deleted old files having relatively high revisiting demands may cause the cache server to have an increased rate of back-to-source. The storage capacity of the cache server may be increased to reduce the number of deleted old files and also reduce the rate of back-to-source. Therefore, the adjustment type of the storage capacity of the cache server may be determined as the capacity to-be-expanded. If the proportion of the old files is greater than and equal to the preset proportion threshold and the visiting rate of the old files is greater than and equal to the preset visiting rate threshold, it may indicate that the cache server may store a large amount of the old files with relatively high revisiting demands and may more rely on the old files to provide services to users, and the cache server may have utilized a relatively large storage capacity to store relatively large amount of the old files; and if the proportion of the old files is less than the preset proportion threshold and the visiting rate of the old files is less than the preset visiting rate threshold, it may indicate that the cache server may more rely on the new files to provide services to users, and the cache server may not waste the storage capacity to store relative large amount of the old files with low revisiting demands. Therefore, for the two cases, if the proportion of the old files is greater than the preset proportion threshold and the visiting rate of the old files is greater than the preset visiting rate threshold, or if the proportion of the old files is less than the preset proportion threshold and the visiting rate of the old files is less than the preset visiting rate threshold, the adjustment type of the storage capacity of the cache server may be determined as the capacity unchanged.

Step 104: determining an adjustment type of the storage capacity of the target service according to the adjustment types of the storage capacities of all of the cache servers corresponding to the target service.

In one embodiment, after all of the cache servers corresponding to the target service are processed according to step 101 to step 103, the adjustment type of the storage capacity of each cache server corresponding to the target service may be determined, and then the adjustment type of the storage capacity of the target service may be further determined.

Optionally, since the target service corresponds to a large number of cache servers, and the storage capacity and the stored files on each cache server are different, the adjustment type of the storage capacity of each cache server may be different. All of the cache servers corresponding to the target service may have a plurality of adjustment types of the storage capacities, so the specific process of step 104 may be the following: determining the number of the cache servers corresponding to the target adjustment type of each storage capacity under the target service; if the proportion of the cache servers corresponding to the target adjustment type in all of the cache servers corresponding to the target service is greater than a preset ratio, the target adjustment type may be used as the adjustment type of the storage capacity of the target service; otherwise, the adjustment type of the storage capacity of the target service may be set as to-be-determined.

In one embodiment, after determining the adjustment types of the storage capacity of all of the cache servers corresponding to the target service, the number of the cache servers corresponding to each adjustment type may be statistically obtained and the proportion of the cache servers corresponding to each adjustment type in all of the cache servers corresponding to the target service may be further obtained. If the proportion of the cache servers corresponding to a certain adjustment type in all of the cache servers corresponding to the target service is larger than the ratio preset by the administrator, it may indicate that, in all of the cache servers corresponding to the target service, the storage capacities of the most cache servers may belong to the certain adjustment type. In order to reduce the workload and facilitate integrated management and deployment, the certain adjustment type may be used as the adjustment type of the storage capacity of the target service, which may be convenient to adjust all of the cache servers corresponding to the target service. If no proportion of the cache servers corresponding to a certain adjustment type in all of the cache servers corresponding to the target service is larger than the ratio preset by the administrator, it may indicate that, in all of the cache servers corresponding to the target service, the proportions of the cache servers corresponding to a plurality of adjustment types in all of the cache servers corresponding to the target service may be similar. The adjustment type of the storage capacity of the target service may be set as to-be-determined. When the storage capacity of the target service needs to be adjusted later, all of the cache servers corresponding to the target service may be split according to the adjustment types, and then the cache servers required to implement the target service may be re-selected.

In the embodiments of the present disclosure, for any cache server corresponding to the target service, the files stored before the preset time node may be used as the old files in the cache server; the proportion of the old files in the all files stored in the cache server and the visiting rate of the old files in the preset visit time range may be determined; the adjustment type of the storage capacity of the cache server may be determined according to the proportion of the old files and the visiting rate of the old files, and the adjustment type may include at least the capacity to-be-expanded, the capacity to-be-reduced and the capacity unchanged; the adjustment type of the storage capacity of the target service may be determined according to the adjustment types of the storage capacities of all of the cache servers corresponding to the target service. In such way, the data visiting situation of the cache server may be judged by the proportion of the old files and the visiting rate of the old files, and the storage requirements and bandwidth requirements of the cache server may be obtained. Then, the adjustment type of the storage capacity of the cache server may be determined and the evaluation of the target service may be implemented by evaluating each cache server of the target service. Therefore, while considering the storage costs and the bandwidth costs, different services may be evaluated.

Figure 2:
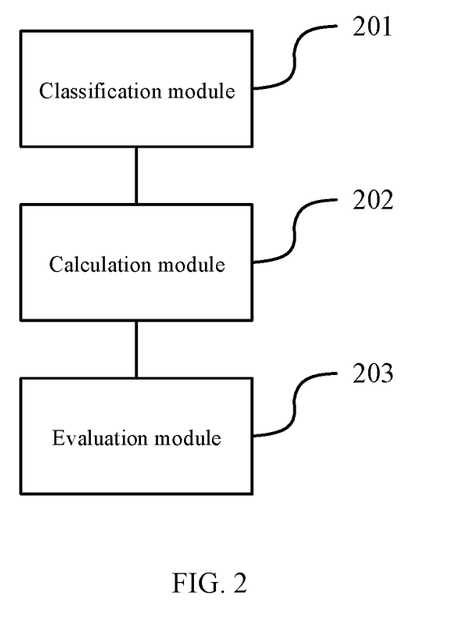
FIG. 2 illustrates a structural schematic of a storage capacity evaluation device based on a CDN application according to embodiments of the present disclosure.

Based on the same technical concept, the embodiments of the present disclosure may further provide a storage capacity evaluation device based on a CDN application. As shown in FIG. 2, the device may include:

a classification module 201, for any cache server corresponding to the target service, configured to use the files stored before the preset time node as the old files in the cache server;

a calculation module 202, configured to determine the proportion of the old files in the all files stored by the cache server and the visiting rate of the old files in the preset visit time range; and an evaluation module 203, configured to determine an adjustment type of a storage capacity of the cache server according to the proportion of the old files and the visiting rate of the old files, where the adjustment types may include capacity to-be-expanded, capacity to-be-reduced and capacity unchanged; and configured to determine an adjustment type of the storage capacity of the target service according to the adjustment types of the storage capacity of all of the cache servers corresponding to the target service.

Optionally, the classification module 201 may be specifically configured to:

acquire the file operation information generated within a preset query time range according to a statistics log within the preset query time range of the cache server, where the file operation information may include file name, file size, file write time and last visit time;

use the files corresponding to the file operation information having a file write time after the preset time node as the new files; and use the files corresponding to the file operation information having the file write time before the preset time node as the old files.

Optionally, the calculation module 202 may be specifically configured to:

determine the total amount of storage of the new files according to a file size of all of the new files;

determine the total amount of storage of the old files according to the total amount of storage of the new files and the storage capacity of the cache server; and determine the proportion of the old files according to the total amount of storage of the old files and the storage capacity of the cache server.

Optionally, the calculation module 202 may further be specifically configured to:

determine the old files having the last visit time within the preset visit time range as the active old files;

determine the total amount of storage of the active old files according to a file size of all of the active old files; and determine the visiting rate of the old files according to the total amount of storage of the active old files and the total amount of storage of the old files.

Optionally, the evaluation module 203 may be specifically configured to:

if the proportion of the old files is greater than a preset proportion threshold and the visiting rate of the old files is less than a preset visiting rate threshold, determine the adjustment type of the storage capacity of the cache server as the capacity to-be-reduced;

if the proportion of the old files is less than the preset proportion threshold and the visiting rate of the old files is greater than the preset visiting rate threshold, determine the adjustment type of the storage capacity of the cache server as the capacity to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determine the adjustment type of the storage capacity of the cache server as the capacity unchanged.

Optionally, the evaluation module 203 may be specifically configured to:

determine the number of the cache servers corresponding to the each target adjustment type of storage capacity under the target service;

if the proportion of the cache servers corresponding to the target adjustment type in all of the cache servers corresponding to the target service is greater than a preset ratio, the target adjustment type may be used as the adjustment type of the storage capacity of the target service;

otherwise, the adjustment type of the storage capacity of the target service may be set as to-be-determined.

Based on the same technical concept, embodiments of the present disclosure further provide a cache server. The cache server may have a relatively large difference due to different configurations or performances. The cache server may include one or more processors and memories, where the memory may be a short-term memory or a permanent memory. The memory may store at least one instruction, at least one program segment, a code set or an instruction set. The at least one instruction, the at least one program segment, the code set or the instruction set may be loaded and executed by the processor to implement the above-mentioned storage capacity evaluation method based on the CDN application. The program stored on the memory may include one or more modules and each module may include a series of instruction operations in the transcoding server.

Based on the same technical concept, embodiments of the present disclosure further provide a computer readable storage medium. The storage medium may store at least one instruction, at least one program segment, a code set, or an instruction set. The at least one instruction, the at least one program segment, the code set or the instruction set may be loaded and executed by the processor to implement the above-mentioned storage capacity evaluation method based on the CDN application.

Through the descriptions of aforementioned embodiments, those skilled in the art may clearly understand that the embodiments may be implemented by means of software in conjunction with an essential common hardware platform or may be simply implemented by hardware. Based on such understanding, the essential part of the aforementioned technical solutions or the part that contribute to the prior art may be embodied in the form of software products. The software products may be stored in computer readable storage media, such as ROM/RAM, magnetic disk, and optical disk, and may include a plurality of instructions to enable a computer device (may be a personal computer, a server, or a network device) to execute the methods described in various embodiments or parts of the embodiments.

The foregoing are merely certain preferred embodiments of the present disclosure and are not intended to limit the present disclosure. Without departing from the spirit and principles of the present disclosure, any modifications, equivalent substitutions, and improvements, etc. shall fall within the scope of the present disclosure.

What is claimed is:

1. A method of storage capacity evaluation based on a content delivery network (CDN) application, comprising:

for each of a plurality of cache servers corresponding to a target service, using files stored before a preset time node as old files in the cache server;

determining a proportion of the old files in all files stored by the cache server and a visiting rate of the old files within a preset visit time range; and determining an adjustment type of a storage capacity of the cache server according to the proportion of the old files and the visiting rate of the old files, wherein the adjustment type at least includes capacity to-be-expanded, capacity to-be-reduced and capacity unchanged; and determining an adjustment type of a storage capacity of the target service according to the determined adjustment types of the storage capacities of the plurality of cache servers corresponding to the target service.

2. The method according to claim 1, wherein using the files stored before the preset time node as the old files in the cache server includes:

acquiring file operation information generated within a preset query time range according to a statistics log within the preset query time range of the cache server, wherein the file operation information includes file name, file size, file write time and last visit time;

using files corresponding to the file operation information having a write time after the preset time node as new files; and using files corresponding to the file operation information having the write time before the preset time node as the old files.

3. The method according to claim 2, wherein determining the proportion of the old files in the all files stored by the cache server includes:

determining a total amount of storage of the new files according to a file size of all of the new files;

determining a total amount of storage of the old files according to the total amount of storage of the new files and the storage capacity of the cache server; and determining the proportion of the old files according to the total amount of storage of the old files and the storage capacity of the cache server.

4. The method according to claim 3, wherein determining the visiting rate of the old files within the present visit time range includes:

determining the old files having a last visit time within the preset visit time range as active old files;

determining a total amount of storage of the active old files according to a file size of all of the active old files; and determining the visiting rate of the old files according to the total amount of storage of the active old files and the total amount of storage of the old files.

5. The method according to claim 1, wherein determining the adjustment type of the storage capacity of the cache server according to the proportion of the old files and the visiting rate of the old files includes:

if the proportion of the old files is greater than a preset proportion threshold and the visiting rate of the old files is less than a preset visiting rate threshold, determining the adjustment type of the storage capacity of the cache server as the capacity to-be-reduced;

if the proportion of the old files is less than the preset proportion threshold and the visiting rate of the old files is greater than the preset visiting rate threshold, determining the adjustment type of the storage capacity of the cache server as the capacity to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determining the adjustment type of the storage capacity of the cache server as the capacity unchanged.

6. The method according to claim 1, wherein determining the adjustment type of the storage capacity of the target service according to the adjustment types of storage capacities of all of the cache servers corresponding to the target service includes:

determining a number of cache servers corresponding to each target adjustment type of the storage capacity under the target service;

if a proportion of the cache servers corresponding to the target adjustment type in all of the cache servers corresponding to the target service is greater than a preset ratio, using the target adjustment type as the adjustment type of the storage capacity of the target service; and otherwise, setting the adjustment type of the storage capacity of the target service as to-be-determined.

7. A device of storage capacity evaluation based on a content delivery network (CDN) application, comprising:

a classification module, for each of a plurality of cache servers corresponding to a target service, configured to use files stored before a preset time node as old files in the cache server;

a calculation module, configured to determine a proportion of the old files in the all files stored by the cache server and a visiting rate of the old files within a preset visit time range; and an evaluation module, configured to determine an adjustment type of a storage capacity of the cache server according to the proportion of the old files and the visiting rate of the old files, wherein the adjustment types include capacity to-be-expanded, capacity to-be-reduced, and capacity unchanged; and configured to determine an adjustment type of a storage capacity of the target service according to the determined adjustment types of the storage capacities of the plurality of cache servers corresponding to the target service.

8. The device according to claim 7, wherein the classification module is configured for:

acquiring file operation information generated within a preset query time range according to a statistics log within the preset query time range of the cache server, wherein the file operation information includes file name, file size, file write time and last visit time;

using files corresponding to the file operation information having a write time after the preset time node as new files; and using files corresponding to the file operation information having the write time before the preset time node as the old files.

9. The device according to claim 8, wherein the calculation module is configured for:

determining a total amount of storage of the new files according to the file size of all of the new files;

determining a total amount of storage of the old files according to the total amount of storage of the new files and the storage capacity of the cache server; and determining the proportion of the old files according to the total amount of storage of the old files and the storage capacity of the cache server.

10. The device according to claim 9, wherein the calculation module is configured for:

determining the old files having a last visit time within the preset visit time range as active old files;

determining a total amount of storage of the active old files according to a file size of all of the active old files; and determining the visiting rate of the old files according to the total amount of storage of the active old files and the total amount of storage of the old files.

11. The device according to claim 7, wherein the evaluation module is configured for:

if the proportion of the old files is greater than a preset proportion threshold and the visiting rate of the old files is less than a preset visiting rate threshold, determining the adjustment type of the storage capacity of the cache server as the capacity to-be-reduced;

if the proportion of the old files is less than the preset proportion threshold and the visiting rate of the old files is greater than the preset visiting rate threshold, determining the adjustment type of the storage capacity of the cache server as the capacity to-be-expanded; and if the proportion of the old files is greater than and equal to the preset proportion threshold and the visiting rate of the old files is greater than and equal to the preset visiting rate threshold, or if the proportion of the old files is less than the preset proportion threshold and the visiting rate of the old files is less than the preset visiting rate threshold, determining the adjustment type of the storage capacity of the cache server as the capacity unchanged.

12. The device according to claim 7, wherein the evaluation module is configured for:

determining a number of cache servers corresponding to each target adjustment type of the storage capacity under the target service;

if a proportion of the cache servers corresponding to the target adjustment type in all of the cache servers corresponding to the target service is greater than a preset ratio, using the target adjustment type as the adjustment type of the storage capacity of the target service; and otherwise, setting the adjustment type of the storage capacity of the target service as to-be-determined.

13. A non-transitory computer readable storage medium, for storing at least one instruction, at least one program segment, a code set or an instruction set;

and when being loaded and executed, a processor is configured to implement a storage capacity evaluation method based on a content delivery network (CDN) application, the method including:

for each of a plurality of cache servers corresponding to a target service, using files stored before a preset time node as old files in the cache server;

determining a proportion of the old files in all files stored by the cache server and a visiting rate of the old files within a preset visit time range; and determining an adjustment type of a storage capacity of the cache server according to the proportion of the old files and the visiting rate of the old files, wherein the adjustment type at least includes capacity to-be-expanded, capacity to-be-reduced and capacity unchanged; and determining an adjustment type of a storage capacity of the target service according to the determined adjustment types of the storage capacities of the plurality of cache servers corresponding to the target service.

\* \* \* \* \*